Sept. 8, 1925.
T. E. SCOFIELD
VEGETABLE CRIB
Filed Sept. 27, 1924
1,552,510
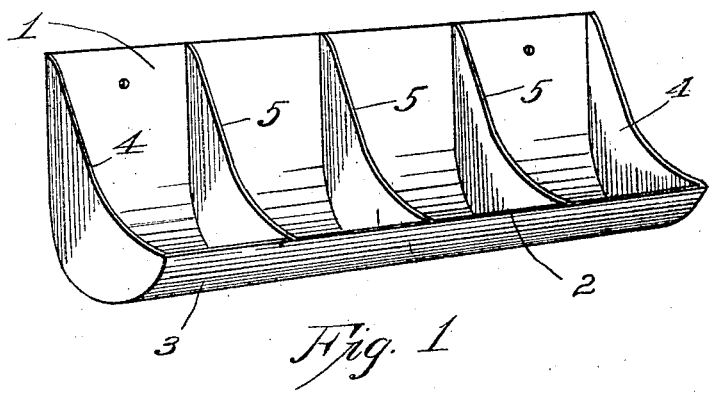
Fig. 1
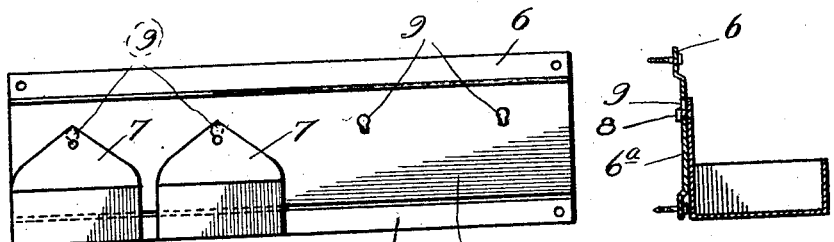 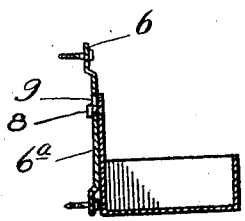
Fig. 2   Fig. 4
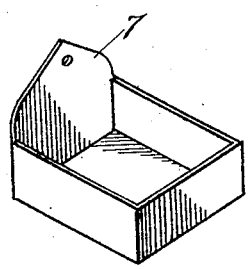
Fig. 3
INVENTOR.
Thomas E. Scofield.
Witness:
R. C. Hamilton Patented Sept. 8, 1925.

1,552,510

UNITED STATES PATENT OFFICE.

THOMAS E. SCOFIELD, OF KANSAS CITY, MISSOURI.

VEGETABLE CRIB.

Application filed September 27, 1924. Serial No. 740,218.

*To all whom it may concern:*

Be it known that I, THOMAS E. SCOFIELD, a citizen of the United States, residing in the city of Kansas City, county of Jackson, and State of Missouri, have invented certain new and useful Improvements in Vegetable Cribs, of which the following is a specification.

This invention relates to improvements in vegetable cribs, and refers more particularly to a portable bin or crib having a plurality of separating walls dividing the crib into containers or receptacles for receiving vegetables or fruits of different kinds; to provide a crib which has a dished or concave bottom to facilitate cleaning and a crib from which the vegetables or fruits may be more easily removed; to provide a crib which is more sanitary than the commonly used vegetable or fruit containers and one which makes the contents more easily accessible.

Fig. 1 is a perspective view of the dished or concave bottom form of crib.

Fig. 2 is a modified form of construction showing the holder with removable containers attached.

Fig. 3 shows one of the receptacles or containers removed from the holder shown in Fig. 2.

Fig. 4 is an edge view of the construction shown in Fig. 2.

Referring to the drawings, the crib comprises a metal sheet 1, whose front edge 2 is upturned forming a concave or dished bottom designated as 3. End walls 4 may be folded or bent from the sheet or inserted separately by riveting, soldering or otherwise fastening to the curved bottom. In a like manner, the partition walls 5 are inserted either by soldering, riveting, or otherwise fastening, to separate the crib into partitions or compartments. In the separate compartments are placed fresh vegetables, fruits or other perishable or staple articles which are usually kept in baskets or boxes in a cool place, such as the entry or on top of the refrigerator or on shelves in cabinets provided for that purpose. It is the usual practice for housewives to keep on hand fresh vegetables, fruits or other perishable or semi-perishable edible commodities. A crib such as that shown in Fig. 1 may be hung by means of fasteners, hooks or screws in the rear entry of vegetable closet or in any suitable place which is handy to the kitchen.

The crib affords a compact arrangement wherein a plurality of bins are mounted in a single element which may be readily cleaned due to the concave bottom construction. In place of the single crib having separate bins for the different fruits or vegetables, a holder 6, such as that shown in Fig. 2, which comprises a sheet of metal having a central raised portion $6^a$. This sheet is fastened to the wall similarly to the crib shown in Fig. 1, and removable boxes or containers, such as that shown in Fig. 3 and designated as 7, may be attached to the holder by means of a lug 8 attached to the back of the containers and fitting into the key slots 9 in the raised portion of the holder. To remove the containers, it is simply necessary to slide this upwardly so that the enlarged portion of the lug registers with the enlarged portion of the key slot at which time the containers are readily removed from the holder. By means of this construction, any desired receptacle containing the vegetables or fruit desired may be removed from the holder and transported into the kitchen or placed in the ice box. The containers have been shown as square box-like construction. It is understood, however, that they may also be made with the concave or rounded dished bottom to facilitate cleaning. The only difficulty with the dished bottom, when used with the removable containers, is their instability and tendency to upset when placed upon a table or shelf. While the crib and holder shown in Figs. 1 and 2 has but four compartments or containers, it is not the purpose of the drawing to limit the invention to this particular number, as any desired number of compartments or containers may be used.

The cribs are preferably constructed of thin sheet galvanized iron, or any desired sheet metal which may be painted in order to prevent rusting, wood, box board, papier mâché, and like material may be used as well.

I claim as my invention:

1. A holder of the character described comprising a portable crib adapted to be hung on a wall, having a front edge, a plurality of partitions therein forming compartments, said partitions having their rear extending above the front edge of the crib whereby they form suspension supports for the bottom.

2. A holder of the character described comprising a portable crib formed of a single sheet of flexible material having a curved bottom, a plurality of partitions therein forming compartments, said partitions having their rear extending above the front edge of the crib, whereby they form suspension supports for the bottom.

3. A holder of the character described comprising a portable crib formed of a single sheet of flexible material having a curved bottom, a plurality of partitions therein having concaved upper edges forming compartments, said partitions having their rear extending above the front edge of the crib, whereby they form suspension supports for the bottom.

THOMAS E. SCOFIELD.